US012234378B2

(12) United States Patent
Reynolds et al.

(10) Patent No.: US 12,234,378 B2
(45) Date of Patent: Feb. 25, 2025

(54) TIE-COAT COMPOSITION

(71) Applicant: Akzo Nobel Coatings International B.V., Arnhem (NL)

(72) Inventors: Kevin John Reynolds, Gateshead (GB); Alison Louise Parry, Durham (GB); Robin Alexander Heath, Gateshead (GB); Graeme Dunford, South Shields (GB); Clayton Price, Whitley Bay (GB)

(73) Assignee: Akzo Nobel Coatings International B.V., Amsterdam (NL)

( * ) Notice: Subject to any disclaimer, the term of this patent is extended or adjusted under 35 U.S.C. 154(b) by 978 days.

(21) Appl. No.: 17/259,283

(22) PCT Filed: Jul. 10, 2019

(86) PCT No.: PCT/EP2019/068505
§ 371 (c)(1),
(2) Date: Jan. 11, 2021

(87) PCT Pub. No.: WO2020/011839
PCT Pub. Date: Jan. 16, 2020

(65) Prior Publication Data
US 2021/0277256 A1  Sep. 9, 2021

(30) Foreign Application Priority Data
Jul. 13, 2018  (EP) ..................................... 18183408

(51) Int. Cl.
| C09D 5/00 | (2006.01) |
| B05D 7/00 | (2006.01) |
| C08F 2/38 | (2006.01) |
| C08F 220/14 | (2006.01) |
| C08F 220/18 | (2006.01) |
| C08F 230/08 | (2006.01) |
| C08K 5/548 | (2006.01) |
| C09D 5/16 | (2006.01) |
| C09D 143/04 | (2006.01) |
| C09D 183/06 | (2006.01) |
| C09D 183/08 | (2006.01) |

(52) U.S. Cl.
CPC ............. *C09D 5/002* (2013.01); *B05D 7/542* (2013.01); *C08F 2/38* (2013.01); *C08F 220/14* (2013.01); *C08F 220/1812* (2020.02); *C08F 230/085* (2020.02); *C08K 5/548* (2013.01); *C09D 5/165* (2013.01); *C09D 143/04* (2013.01); *C09D 183/06* (2013.01); *C09D 183/08* (2013.01); *B05D 2420/01* (2013.01); *B05D 2420/02* (2013.01)

(58) Field of Classification Search
CPC ........ C09D 5/002; C09D 5/548; C09D 5/165; C09D 143/04; C09D 183/06; C09D 183/08; C08F 220/1812; C08F 220/14; C08F 230/085; C08F 2/38; B05D 7/542; B05D 2420/01; B05D 2420/02
USPC .......................................................... 526/279
See application file for complete search history.

(56) References Cited

U.S. PATENT DOCUMENTS

| 3,702,778 | A | 11/1972 | Mueller et al. .......... B32B 15/08 |
| 5,990,257 | A | 11/1999 | Johnston et al. ....... C08G 18/71 |
| 6,013,754 | A | 1/2000 | Fillion et al. ........... C08G 77/04 |
| 2008/0280149 | A1 | 11/2008 | Higuchi et al. ............ B32B 9/04 |
| 2011/0250350 | A1 | 10/2011 | Thorlaksen et al. ...... B05D 3/10 |
| 2020/0024462 | A1 * | 1/2020 | Moore .................. C09D 5/1675 |

FOREIGN PATENT DOCUMENTS

| CN | 101134887 A | 3/2008 | |
| GB | 1307001 | 2/1973 | |
| JP | 2011057792 A | 3/2011 | |
| JP | 2011526311 | 10/2011 | |
| WO | WO-9933927 A1 * | 7/1999 | ........... C09D 133/12 |
| WO | 2007/122325 A1 | 11/2007 | |
| WO | 2008/055985 A1 | 5/2008 | |
| WO | 2009/085121 A1 | 7/2009 | |
| WO | 2009/106717 A2 | 9/2009 | |
| WO | 2009/106718 A1 | 9/2009 | |
| WO | WO-2010000477 A1 * | 1/2010 | ............ C08F 255/00 |
| WO | 2011/076856 A1 | 6/2011 | |

(Continued)

OTHER PUBLICATIONS

Search Report of Corresponding EP Application No. 181834086, dated Oct. 31, 2018.
International Search Report and Written Opinion for PCT/EP219/068505 mailed Oct. 17, 2019.
International Preliminary Report on Patentability for PCT/EP219/068505 mailed Sep. 22, 2020.
"Decision of Rejection," for Japanese Patent Application No. 2021-500276 mailed Dec. 13, 2022 (7 pages) with English Translation.

*Primary Examiner* — Michael M. Bernshteyn
(74) *Attorney, Agent, or Firm* — Pauly, DeVries Smith & Deffner LLC

(57) ABSTRACT

The present disclosure relates to a tie-coat composition comprising one or more binder polymers obtainable by copolymerizing a mixture of ethylenically unsaturated monomers, wherein the tie-coat composition provides a tie-coat with good dry adhesion, freshwater adhesion and saltwater adhesion to topcoats based on resins with condensable silane groups such as polydiorganosiloxane resins with hydrolysable groups or organic resins with terminal and/or pendant alkoxysilyl groups. The present disclosure further relates to a process for controlling aquatic fouling on a surface of a man-made object comprising applying such tie-coat composition and a topcoat composition, and to a substrate coated with a tie-coat layer deposited from such tie-coat composition and a topcoat layer.

23 Claims, No Drawings

(56) References Cited

FOREIGN PATENT DOCUMENTS

| WO | 2012/146023 A1 | 11/2012 |
| WO | 2013/107827 A1 | 7/2013 |
| WO | 2014/131695 A1 | 9/2014 |

\* cited by examiner

TIE-COAT COMPOSITION

CROSS-REFERENCE TO RELATED APPLICATIONS

This application is a 35 U.S.C. § 371 national phase application of PCT Application No. PCT/EP2019/08505 (WO 2020/011839 A1), filed on Jul. 10, 2019, which claims the benefit of priority to EP Application No. 18183408.6, filed on Jul. 13, 2018, each of which is incorporated herein by reference in its entirety.

FIELD OF THE INVENTION

The present invention relates to a tie-coat composition, a process for controlling aquatic fouling on a surface of a man-made object comprising applying such tie-coat composition and a topcoat composition, and a substrate coated with a tie-coat layer deposited from such tie-coat composition and a topcoat layer.

BACKGROUND OF THE INVENTION

Man-made structures such as ship and boat hulls, buoys, drilling platforms, dry dock equipment, oil production rigs, aquaculture equipment and netting and pipes which are immersed in water, or have water running through them, are prone to fouling by aquatic organisms such as green and brown algae, barnacles, mussels, and the like. Such structures often are of metal, but may also be made of other structural materials such as concrete, glass reinforced plastic or wood. Such fouling is a nuisance on ship and boat hulls, because it increases frictional resistance during movement through the water. As a consequence speed is reduced and fuel consumption increased. It is a nuisance on static structures such as the legs of drilling platforms and oil and gas production, refining and storage rigs, firstly because the resistance of thick layers of fouling to waves and currents can cause unpredictable and potentially dangerous stresses in the structure, and, secondly, because fouling makes it difficult to inspect the structure for defects such as stress cracking and corrosion. It is a nuisance in pipes such as cooling water intakes and outlets, because the effective cross-sectional area is reduced by fouling, with the consequence that flow capacity is reduced.

It is known, that coatings with polysiloxane-based resins resist fouling by aquatic organisms. Such coatings are for example disclosed in GB 1307001 and U.S. Pat. No. 3,702,778. It is believed that such coatings present a surface to which the organisms cannot easily adhere. Accordingly, such coatings are often called fouling release or fouling resistant. Silicone rubbers and silicone compounds generally have very low toxicity.

In WO 2014/131695 is described an anti-fouling composition comprising a curable organosiloxane-containing polymer and a fluorinated oxyalkylene-containing polymer or oligomer.

In WO 2013/107827 is described a coating composition, for use as a tie-coat or a topcoat in a foul release coating, comprising a curable polysiloxane and a silane terminated polyurethane. The curable polysiloxane and the silane terminated polyurethane are designed to co-cure.

Tie-coats are generally applied to substrates to provide a good bonding surface for topcoats. Such tie-coats are deposited from tie-coat compositions that are applied to the substrate, usually a primed substrate. For polysiloxane-based topcoats, tie-coat compositions comprising polysiloxane resins are often used; for example those described in U.S. Pat. No. 6,013,754 or in WO 2013/107827. It is also known to use tie-coat compositions comprising film-forming polymers with a non-polysiloxane polymer backbone and alkoxysilane functional groups. Such tie-coat compositions are for example disclosed in WO 99/33927.

There is still a need for tie-coat compositions that show improved adhesion to foul release topcoats based on resins with condensable silane groups, such as polysiloxane resins or silane terminated polyurethanes or polyesters.

SUMMARY OF THE INVENTION

Surprisingly, it has now been found that the use of a tie-coat composition comprising one or more binder polymers obtainable by copolymerizing a mixture of ethylenically unsaturated monomers, and comprising pendant curable alkoxysilyl functional groups of general formula:

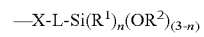

wherein L is a hydrocarbon linker group; X is a heteroatom other than a sulphur atom; n is 0, 1, or 2; $R^1$ is an alkyl radical with 1 to 20 carbon atoms; and $R^2$ is an alkyl radical with 1 to 20 carbon atoms or an alkylalkoxy radical with 2 to 20 carbon atoms, results in very good adhesion of topcoats based on resins with condensable silane groups to a tie-coat deposited from such tie-coat composition, when part of the curable alkoxysilyl functional groups of the binder polymers in the tie-coat have a linker group L that is a methyldiyl group and part of the alkoxysilyl functional groups have a linker group L that is a hydrocarbon group having two to twenty carbon atoms.

Accordingly, in a first aspect the invention provides a tie-coat composition comprising one or more binder polymers obtainable by copolymerizing a mixture of ethylenically unsaturated monomers, the one or more binder polymers comprising pendant curable alkoxysilyl functional groups of general formula (I)

wherein:
- L is a hydrocarbon linker group having 1 to 20 carbon atoms;
- X is a heteroatom other than a sulphur atom, preferably an oxygen or nitrogen atom;
- n is 0, 1, or 2, preferably n is 0 or 1;
- $R^1$ is an alkyl radical with 1 to 20 carbon atoms; and
- $R^2$ is an alkyl radical with 1 to 20 carbon atoms or an alkylalkoxy radical with 2 to 20 carbon atoms, preferably an alkyl radical with 1 to 20 carbon atoms, wherein in at least 5 mole % of the curable alkoxysilyl functional groups comprised in the one or more binder polymers the hydrocarbon linker group L is a methyldiyl group (L1) and in at least 5 mole % of the curable alkoxysilyl functional groups comprised in the one or more binder polymers the hydrocarbon linker group L is a hydrocarbon group having 2 to 20 carbon atoms (L2), wherein the tie-coat composition does not comprise a crosslinking agent.

The tie-coat composition according to the invention provides a tie-coat with very good dry adhesion, freshwater adhesion and saltwater adhesion to topcoats based on resins with condensable silane groups such as polydiorganosiloxane resins with hydrolysable groups or organic resins with terminal and/or pendant alkoxysilyl groups. Therefore, the tie-coat composition according to the invention is particularly suitable to be used in combination with a foul release coating composition comprising a resin with condensable silane groups.

In a second aspect the invention provides a process for controlling aquatic fouling on a surface of a man-made object comprising:

applying on the surface of the man-made object a first layer of a tie-coat composition according to the first aspect of the invention;

applying on the first layer of tie-coat composition a second layer of a topcoat composition comprising a resin with condensable silane groups; and allowing the first and second coating layers to cure.

In a third aspect, the invention provides a substrate coated with a tie-coat layer and a topcoat layer, wherein the tie-coat layer is deposited from a tie-coat composition according to the first aspect of the invention and the topcoat layer is deposited from a topcoat composition comprising a resin with condensable silane groups.

DETAILED DESCRIPTION OF THE INVENTION

The tie-coat composition according to the invention comprises one or more binder polymers obtainable by copolymerizing a mixture of ethylenically unsaturated monomers. The one or more binder polymers comprise pendant curable alkoxysilyl functional groups of general formula (I)

$$—X-L-Si(R^1)_n(OR^2)_{(3-n)} \quad (I)$$

In the alkoxysilyl moiety $—Si(R^1)_n(OR^2)_{(3-n)}$ of the alkoxysilyl functional group, n is 0, 1, or 2. Preferably, n is 0 or 1.

$R^1$ is an alkyl radical with 1 to 20 carbon atoms. The alkyl radical may be a linear or branched alkyl radical. Preferably $R^1$ is an alkyl radical with 1 to 6 carbon atoms, more preferably a methyl or ethyl radical. $R^2$ is an alkyl radical with 1 to 20 carbon atoms or an alkylalkoxy radical with 2 to 20 carbon atoms. $R^2$ may be linear or branched. Preferably $R^2$ is an alkyl radical with 1 to 20 carbon atoms, more preferably an alkyl radical with 1 to 6 carbon atoms, even more preferably a methyl or ethyl radical. Examples of particularly suitable alkoxysilyl moieties are trimethoxysilyl, methyldimethoxy silyl, triethoxysilyl, methyldiethoxysilyl, and ethyldimethoxysilyl.

The alkoxysilyl moiety of the curable alkoxysilyl functional group is covalently linked to X, a heteroatom other than a sulphur atom, via a linker group L that is resistant to aqueous hydrolysis in natural waters including seawater. Linker group L is a hydrocarbon group having 1 to 20 carbon atoms. L may be a branched, unbranched, saturated or unsaturated hydrocarbon group, for example an alkyldiyl, arylalkyldiyl or aryldiyl group. Preferably, L is an alkyldiyl group having 1 to 20. Reference herein to an alkyldiyl group is to a divalent radical of the general formula $C_2H_{2n}$ (wherein n is an integer with a value of at least 1), derived from an aliphatic hydrocarbon.

At least 5% mole of the curable alkoxysilyl functional groups comprised in the one or more binder polymers have a linker group L which is a methyldiyl group (further referred to as L1) and at least 5 mole % of the curable alkoxysilyl functional groups comprised in the one or more binder polymers have a linker group L which is a hydrocarbon group having 2 to 20 carbon atoms (further referred to as L2), preferably an alkyldiyl group having 2 to 6 carbon atoms, more preferably a propyldiyl group.

Heteroatom X is a heteroatom other than sulphur. Preferably, X is an oxygen or nitrogen atom. When X is an oxygen atom, the oxygen atom suitably forms part of an ether group (—O—), an ester group (—C(O)O—), a carbonate group (—O—C(O)O—) or carbamate group (—NC(O)O—). When X is a nitrogen atom, the nitrogen atom suitably forms part of a secondary of tertiary amine group, an amide group, a carbamate group, or urea group. Preferably, X forms part of an ester, amide, ether, or amine group. The group of which heteroatom X forms part is directly or indirectly covalently linked to the polymer backbone of the binder polymer.

Preferably, in the range of from 15 to 75 mole % of the curable alkoxysilyl functional groups comprised in the one or more binder polymers is a curable alkoxysilyl functional group with linker group L1 and in the range of from 25 to 85 mole % of the curable alkoxysilyl functional groups comprised in the one or more binder polymers is a curable alkoxysilyl functional group with linker group L2. More preferably, in the range of from 20 to 70% of the curable alkoxysilyl functional groups comprised in the one or more binder polymers is a curable alkoxysilyl functional group with linker group L1 and in the range of from 30 to 80% of the curable alkoxysilyl functional groups comprised in the one or more binder polymers is a curable alkoxysilyl functional group with linker group L2.

The curable alkoxysilyl functional groups with linker group L1 and the curable alkoxysilyl functional groups with group L2 may be functional groups of the same or of different binder polymers. In a preferred embodiment the tie-coat composition comprises a first binder polymer and a second binder polymer, each obtainable by copolymerizing a mixture of ethylenically unsaturated monomers and each comprising curable alkoxysilyl functional groups according to formula (I), wherein the curable alkoxysilyl functional groups comprised in the first binder polymer have linker group L1 and the curable alkoxysilyl functional groups comprised in the second binder polymer have linker group L2.

In this embodiment, the weight ratio of the first binder polymer to the second binder polymer in the tie-coat composition is preferably in the range of from 15:85 to 75:25, i.e. the amount of first binder polymer is in the range of from 15 to 75 wt % based on the total weight of first and second binder polymer. More preferably, the weight ratio is in the range of from 20:80 to 70:30.

The curable alkoxysilyl functional groups provide latent reactivity to the binder polymer(s). As a result, application of a coating composition with condensable silane groups on top of the tie-coat composition results in a curing reaction between the curable alkoxysilyl functional groups of the tie-coat composition and the condensable silane groups of the topcoat composition.

In order to provide latent reactivity to the one or more binder polymers, the one or more binder polymers preferably have no functional groups other than alkoxysilyl groups that can crosslink with the curable alkoxysilyl functional groups, such as for example reactive amine groups or silanol groups. Preferably, the one or more binder polymers have no functional groups other than curable alkoxysilyl functional groups.

The one or more binder polymers are obtainable by copolymerizing a mixture of ethylenically unsaturated monomers, preferably by radical polymerization of one or more ethylenically unsaturated monomers. The ethylenically unsaturated monomers are preferably selected from the group consisting or acrylic acid, methacrylic acid, esters or amides of acrylic acid and methacrylic acid, styrene, and combinations of two or more thereof.

In a preferred embodiment, the one or more binder polymers are, independently, obtainable by copolymerizing a mixture of ethylenically unsaturated monomers with alkoxysilyl functionality and ethylenically unsaturated monomers without alkoxysilyl functionality.

Preferably, the molar ratio between ethylenically unsaturated monomers with alkoxysilyl functionality and ethylenically unsaturated monomers without alkoxysilyl functionality is in the range of from 5:95 to 25:75, more preferably of from 8:92 or 12:88 to 20:80.

Examples of particularly suitable ethylenically unsaturated monomers with alkoxysilyl functionality include trimethoxysilylmethyl (meth)acrylate, methyldimethoxysilylmethyl (meth)acrylate, triethoxysilylmethyl (meth)acrylate, methyldimethoxysilylmethyl (meth)acrylate, 3-(trimethoxysilyl)propyl (meth)acrylate, 3-(methyldimethoxysilyl)propyl (meth)acrylate, 3-(triethoxysilyl)propyl (meth)acrylate, 3-(methyldimethoxysilyl)propyl (meth)acrylate, 3-(trimethoxysilyl)propyl (meth)acrylamide, N-(3-acryloxy-2-hydroxypropyl)-3-aminopropyltrimethoxysilane, O-(methacryloxyethyl)-N-(triethoxysilylpropyl) carbamate, N-(3-methacryloxy-2-hydroxypropyl)-3-aminopropyltriethoxysilane, 3-(triisopropyloxysilyl)propyl (meth)acrylate.

Preferred ethylenically unsaturated monomers without alkoxysilyl functionality are acrylic acid, methacrylic acid, esters of acrylic acid, esters of methacrylic acid, styrene, and combinations of two or more thereof. Esters of acrylic acid and/or of methacrylic acid derived from a saturated alcohol with one to sixteen carbon atoms are particularly preferred. Examples of particularly preferred unsaturated monomers without alkoxysilyl functionality are methyl methacrylate, butyl acrylate, butyl methacrylate, ethylhexyl acrylate, ethylhexyl methacrylate, lauryl acrylate, lauryl methacrylate, isobornyl acrylate, isobornyl methacrylate.

It may be advantageous, for example to control the glass transition temperature of the binder polymer, to use two or more different ethylenically unsaturated monomers without alkoxysilyl functionality, for example a $C_1$-$C_4$ (meth)acrylate and a C6-C16 (meth)acrylate, such as a mixture of methylmethacrylate and laurylmethacrylate.

In the preparation of the one or more binder polymers, a chain transfer agent may be used. Suitable chain transfer agents are known in the art and include alkyl thiols such as 1-butanethiol or 1-dodecanethiol and alkoxysilylalkyl thiols such as for example 3-mercaptopropyltrimethoxysilane.

Typically, an initiator will be used in the radical polymerization of the one or more ethylenically unsaturated monomers. Suitable initiators are well known in the art and include organic peroxides such as t-butyl peroxy-2-ethylhexanoate and azo compounds such as 2,2'azobis(2-methylbutyronitrile).

Instead of using monomers which already carry alkoxysilyl functional groups, such groups may be grafted onto an already formed polymer. For example, alkoxysilyl functional groups may be incorporated by reacting epoxy-functional groups on a prepolymer with an epoxy-reactive alkoxysilane, or by reacting isocyanate-functional groups on a prepolymer with an isocyanate-reactive alkoxysilane.

The one or more binder polymers preferably have, independently, a number-average molecular weight in the range of from 1,000 to 50,000 Daltons, more preferably of from 2,000 to 15,000 Daltons, even more preferably of from 3,000 to 10,000 Daltons. Reference herein to the number-average molecular weight is to the number-average molecular weight as determined by ASTM D5296.

Preferably the tie-coat composition is free of any binder polymers other than the one or more binder polymers as hereinbefore defined.

In order to provide latent reactivity, the tie-coat composition does not comprise a crosslinking agent (curing agent). The tie-coat composition may comprise a curing catalyst. Preferably, the tie-coat composition does not comprise a curing catalyst. Preferably, the tie-coat composition does not comprise any further material that affects the latent reactivity, such as acids, bases, organic metal salts, water, or other protonic solvents.

The tie-coat composition may comprise further compounds such as organic solvents, fillers, color pigments, barrier pigments, plasticizers or other additives. Examples of a suitable organic solvent include xylene and methyl n-amyl ketone.

Preferably, the tie-coat composition comprises in the range of from 65 to 95 wt % of binder polymer, more preferably of from 70 to 90 wt %.

The tie-coat composition is formulated such that during a desired latency period, only a minimum of curing of the applied tie-coat composition occurs. Initial film formation occurs through solvent evaporation rather than by crosslinking reactions. A practical minimum latency period is the minimum time interval required between application of the tie-coat composition and application of a subsequent topcoat composition. Typically, a minimum latency period of 2 hours is needed, more preferably at least 12 hours, or at least 24 hours, or even at least a week.

The latency period for a given coating can be determined using a standard over-coating test under specified conditions of temperature and humidity. Test portions of a coating composition with a resin with condensable silane groups are applied at different time intervals to different test areas of a substrate initially coated with the tie-coat composition. The coating composition with a resin with condensable silane groups (topcoat) is then allowed to cure. The latency period is defined as the maximum time after application of the initial tie-coat layer at which satisfactory adhesion of the topcoat is still achieved.

In a second aspect, the invention provides a process for controlling aquatic fouling on a surface of a man-made object. The process comprises applying a first layer of a tie-coat composition according to the invention on the surface of the man-made object, subsequently applying a second layer of a topcoat composition comprising a resin with condensable silane groups on the first layer, and then allowing the first and the second layer to cure.

The second layer may be applied at any time before the end of the latency period of the applied tie-coat composition. After application of the second layer, the first and the second layer are allowed to cured, typically at ambient conditions, i.e. at a temperature in the range of from −5° C. to 40° C.

The tie-coat composition and the topcoat composition may be applied by known techniques for applying liquid coating compositions, such as brush, roller, dipping, bar or spray (airless and conventional) application.

The topcoat composition comprises a resin with condensable silane groups. Reference herein to a condensable silane group is to a reactive silanol group or to a group comprising a silicon atom covalently linked to a leaving group that forms a reactive silanol upon hydrolysis. Examples of such groups are alkoxysilyl groups (containing a silicon atom covalently linked to the oxygen atom of an alkoxy group), silyl ester groups (containing a silicon atom covalently linked to the oxygen atom of a carboxylic group), silyl amino groups (containing a silicon atom covalently linked to the carbon atom of an amine), or silyl ketoxime groups (containing a silicone atom covalently bound to the oxygen of a ketoxime).

The reactive silanol groups can then self-condense and condense with the alkoxysilyl groups of the first and second binder polymers of the tie-coat composition according to the invention to form siloxane bonds. Thus, curing of the topcoat composition and adhesion between the tie-coat layer and the topcoat layer is achieved.

The resin with condensable silane groups may be a curable polydiorganosiloxane, i.e. a resin with a polysiloxane backbone of repeating units of formula —Si(R')(R")—O— wherein R' and R" are, independently, a hydrocarbyl radical. Such curable polydiorganosiloxane has pendant and/or terminal condensable silane groups, preferably pendant and/or terminal silanol groups, alkoxysilyl groups, and/or silyl amino groups.

Alternatively or additionally, the resin with condensable silane groups may be a polymer having an organic backbone, for example a polyurethane, polyether, polyester, polyurea, or polyacrylate backbone. The polymer has pendant and/or terminal and pendant condensable silane groups attached to the organic backbone, preferably pendant and/or terminal silanol and/or alkoxysilyl groups. Such resins are for known in the art. Suitable examples of polymers with an organic, non-polysiloxane backbone are silane terminated polyurethanes or polyethers such as for example described in U.S. Pat. No. 5,990,257 or WO 2012/146023.

Polydiorganosiloxanes with curable silanol or alkoxysilyl groups, i.e. with a hydroxyl or alkoxy with its O atom directly and covalently linked to a silicon atom, are well-known in the art. Examples of commercially available polydiorganosiloxanes with curable silanol or alkoxysilyl groups include Dow Corning 3-0213 Polymer, Xiameter OHX-4010 Polymer.

The topcoat composition may comprise more than one resin with condensable silane groups. The topcoat composition may comprise further curable polymers. Preferably, the topcoat composition does not comprise curable polymers other than the resin with condensable silane groups.

The topcoat composition may comprise a crosslinking agent for the curing reaction and/or a curing catalyst.

The cross-linking agent (also referred to as curing agent) may be any crosslinking agent suitable for crosslinking silanol or alkoxysilyl groups. Such crosslinking agents are known in the art. Functional silanes are known as suitable crosslinking agents. Preferred crosslinking agents include tetra-alkoxy orthosilicates (also referred to as tetra-alkoxysilanes), such as for example tetra-ethylorthosilicate, or partial condensates thereof, and organofunctional alkoxysilanes, such as amino alkoxysilanes, glycidoxy alkoxysilanes, methacryloxy alkoxysilanes, carbamato alkoxysilanes, and alkoxysilanes with an isocyanurate functional group. Examples of particularly suitable crosslinking agents are tetra-ethylorthosilicate or partial condensates thereof, N-[3-(trimethoxysilyl)propyl]ethylenediamine, and (N,N-diethylaminomethyl) triethoxysilane.

The crosslinking agent may be used in any suitable amount, typically up to 10 wt % based on the weight of the resin with condensable silane groups, preferably in the range of from 1 to 5 wt %.

In case an organofunctional alkoxysilane with the alkoxysilane functionality in an alpha position to the organofunctional group is used as crosslinking agent, the coating composition may be cured under ambient conditions in the absence of a curing catalyst. Suitable organofunctional alkoxysilanes with the alkoxysilane functionality in an alpha position to the organofunctional group include alpha aminosilanes. (N,N-diethylaminomethyl)triethoxysilane is a particularly preferred alpha aminosilane.

Instead of or in addition to a crosslinking agent, the topcoat composition may comprise a curing catalyst. Any catalyst suitable for catalyzing the condensation reaction between silanol groups may be used. Such catalysts are well known in the art and include carboxylic acid salts of various metals, such as tin, zinc, iron, lead, barium, and zirconium. Such salts preferably are salts of long-chain carboxylic acids, for example dibutyltin dilaurate, dioctyltin dilaurate, dibutyltin dioctoate, iron stearate, tin (II) octoate, and lead octoate. Further examples of suitable catalysts include organobismuth, organotitanium compounds, organo-phosphates such as bis(2-ethylhexyl) hydrogen phosphate. Other possible catalysts include chelates, for example dibutyltin acetoacetonate, or compound comprising amine-ligands such as for example 1,8-diazabicyclo(5.4.0)undec-7-ene. The catalyst may comprise a halogenated organic acid which has at least one halogen substituent on a carbon atom which is in the alpha position relative to the acid group and/or at least one halogen substituent on a carbon atom which is in the beta position relative to the acid group, or a derivative which is hydrolysable to form such an acid under the conditions of the condensation reaction. Alternatively, the catalyst may be as described in any of WO 2007/122325, WO 2008/055985, WO 2009/106717, and WO 2009/106718.

The catalyst may be used in any suitable amount, preferably in the range of from 0.1 to 10 wt % based on the total weight of the resin with condensable silane groups, more preferably in the range of from 0.2 to 1.0 wt %.

In addition to the resin with condensable silane groups, the topcoat composition may comprise a marine biocide and/or a non-curable, non-volatile compound (an incompatible fluid). Reference herein to a non-curable compound is to a compound that does not participate in the curing reaction of the resin with condensable silane groups or any further curable polymer in the topcoat composition. Reference herein to non-volatile compounds is to compounds that do not boil at a temperature below 250° C., at atmospheric pressure.

Suitable examples of such non-curable, non-volatile compounds include silicone oils, fluorinated polymers, sterols and sterol derivatives such as for example lanolin, lanolin oil, or acetylated lanolin, hydrophilic-modified polysiloxanes such as poly(oxyalkylene)-modified polysiloxane oils. Examples of commercially available suitable silicone oils are Rhodorsil Huile 510V100 and Rhodorsil Huile 550 from Bluestar Silicones. Examples of suitable fluorinated polymers include linear and branched trifluoromethyl fluorine end-capped perfluoropolyethers (e.g. Fomblin Y®, Krytox K® fluids, or Demnum S® oils); linear di-organo (OH) end-capped perfluoropolyethers (eg Fomblin Z DOL®, Fluorolink E®); low molecular weight polychlorotrifluoroethylenes (eg Daifloil CTFE® fluids); and fluorinated oxyalkylene-containing polymer or oligomer as described in WO 2014/131695. Commercially available examples of suitable hydrophilic-modified polysiloxane oils include DC5103, DC Q2-5097, DC193, DC Q4-3669, DC Q4-3667, DC57 and DC2-8692 (all Dow Corning) and BYK333.

A non-curable, non-volatile compound may be added in any suitable amount, typically up to 20 wt % based on the total weight of the coating composition, preferably in the range of from 1 to 10 wt %, more preferably of from 2 to 7 wt %.

The marine biocide may be any biocide known to have biocidal activity against marine or freshwater organisms. Suitable marine biocides are well-known in the art and include inorganic, organometallic, metal-organic or organic biocides. The biocide may optionally be wholly or partially encapsulated, adsorbed, entrapped, supported or bound.

Preferably, the topcoat composition is free of marine biocide.

The topcoat composition may comprise an organic solvent to achieve a required application viscosity. Alternatively, the topcoat composition may be essentially or entirely free of volatile organic solvent, for example when the resin with condensable silane groups is liquid and has a sufficiently low viscosity, or when reactive diluents or liquid plasticizers are included. The topcoat composition is preferably a non-aqueous coating composition. A non-aqueous composition means that the composition is supplied in a form which is essentially free or entirely free of water. By essentially free of water it is meant that the composition comprises between 0 and 5% by weight, preferably between 0 and 2% by weight of water, calculated on the total weight of the composition. The mentioned amounts of water may be unintentionally introduced by components included in the topcoat composition, for example by pigments or organic solvents which contain low amounts of water as impurity.

Suitable organic solvents for use in the topcoat composition include aromatic hydrocarbons, alcohols, ketones, esters, and mixtures of the above with one another or an aliphatic hydrocarbon. Preferable solvents include ketones such as methyl isopentyl ketone and/or hydrocarbon solvents, such as xylene, trimethyl benzene, or aliphatic cyclic or acyclic hydrocarbons, as well as mixture thereof.

The topcoat composition may further comprise extender pigments (fillers) and/or color pigments and one or more additives commonly used in foul release coating compositions, such as wetting agents, dispersing agents, flow additives, rheology control agents, adhesion promoters, antioxidants, UV stabilizers, and plasticizers.

Examples of suitable extender pigments include barium sulphate, calcium sulphate, calcium carbonate, silicas or silicates (such as talc, feldspar, and china clay), including pyrogenic silica, bentonite and other clays, and solid particulate non-curable silicone resins, which are generally condensed branched polysiloxanes, such as a silicone resin comprising Q units of the formula $SiO_{4/2}$ and M units of the formula $R'''_3SiO_1/2$, wherein the $R'''$ substituents are selected from alkyl groups having 1 to 6 carbon atoms and the ratio of M units to Q units is in the range of 0.4:1 to 1:1. Some extender pigments, such as fumed silica, may have a thixotropic effect on the topcoat composition. The proportion of fillers may be in the range of from 0 to 25 wt %, based on the total weight of the topcoat composition. Preferably clay is present in an amount of 0 to 1 wt % and preferably the thixotrope is present in an amount of 0 to 5 wt %, based on the total weight of the topcoat composition.

Examples of color pigments include black iron oxide, red iron oxide, yellow iron oxide, titanium dioxide, zinc oxide, carbon black, graphite, red molybdate, yellow molybdate, zinc sulfide, antimony oxide, sodium aluminium sulfosilicates, quinacridones, phthalocyanine blue, phthalocyanine green, indanthrone blue, cobalt aluminium oxide, carbazoledioxazine, chromium oxide, isoindoline orange, bis-acetoaceto-tolidiole, benzimidazolone, quinaphtalone yellow, isoindoline yellow, tetrachloroisoindolinone, and quinophthalone yellow, metallic flake materials (e.g. aluminium flakes).

The topcoat composition may also comprises so-called barrier pigments or anti-corrosive pigments such as zinc dust or zinc alloys, or so-called lubricious pigments such as graphite, molybdenum disulfide, tungsten disulphide or boron nitride.

The pigment volume concentration of the topcoat composition preferably is in the range of 0.5-25%. The total amount of pigments may be in the range of from 0 to 25 weight %, based on the total weight of the topcoat composition.

The topcoat composition preferably has a non-volatile content, defined as the weight percentage of non-volatile material in the topcoat composition, of at least 35 weight %, more preferably at least 50 weight %, even more preferably at least 70 weight %. The non-volatile content can range up to 80 weight %, 90 weight %, 95 weight % and preferably up to 100 weight %. The non-volatile content may be determined in accordance with ASTM method D2697

The process according to the invention is found to be particularly suitable for controlling aquatic fouling on surfaces of man-made objects that are still at least partly covered with an aged or damaged coating. The tie-coat composition according to the invention is found to result in a tie-coat that adheres sufficiently well to such aged or damaged coating.

In its third aspect, the invention provides a substrate coated with a tie-coat layer deposited from the tie-coat composition according to the first aspect of the invention and a topcoat layer deposited from a topcoat composition as hereinbefore defined.

The substrate to be coated may be a surface of a structure to be immersed in water, such as metal, concrete, wood, or polymeric substrates. Examples of polymeric substrates are polyvinyl chloride substrates or composites of fiber-reinforced resins. In an alternative embodiment, the substrate is a surface of a flexible polymeric carrier foil. The tie-coat and topcoat compositions are then applied to one surface of the flexible polymeric carrier foil, for example a polyvinyl chloride carrier foil, and cured, and subsequently the other, non-coated surface of the carrier foil is laminated to a surface of a structure to be provided with fouling-resistant and/or foul release properties, for example by use of an adhesive.

The substrate to be coated may be a bare surface, or an already coated surface, for example a surface coated with one or more primer or anticorrosive coatings or a surface that has layer(s) of aged or damaged coating on it.

EXAMPLES

The invention will be further illustrated by means of the following non-limiting examples.
Preparation of Resins for Tie-Coat Compositions
First Binder Polymer—L1 Linker A siloxane functional polyacrylate was prepared by copolymerizing a mixture of methyl methacrylate, lauryl methacrylate and trimethoxysilylmethyl methacrylate in the presence of mercaptopropyl trimethoxysilane as chain transfer agent and 2,2'azobis(2-methylbutyronitrile (AMBN) as initiator in methyl n-amyl ketone (MAK) as solvent at 100° C. The methyl methacrylate/lauryl methacrylate/trimethoxysilylmethyl methacrylate/mercaptopropyl trimethoxysilane molar ratio was 70/12/15/3. A solution of 70 wt % polymer (number averaged molecular weight 3,400 Daltons) in MAK was obtained.

Second Binder Polymer—L2 Linker

A siloxane functional polyacrylate was prepared as described above for acrylic tie-coat composition 1, but with trimethoxysilylpropyl methacrylate instead of trimethoxysilylmethyl methacrylate. A solution of 70 wt % polymer (number averaged molecular weight 3,200 Daltons) in MAK was obtained.

Preparation of Tie-Coat Compositions

Tie-Coat Composition 1 (Comparative)

The solution of 70 wt % solution of second binder polymer in MAK prepared as described above was used as tie-coat composition 1.

Tie-Coat Composition 2 (Inventive)

The solutions of the first and the second binder polymers were mixed in a 40/60 weight such that the resulting mixture comprised 40 wt % of the first binder polymer and 60 wt % of the second binder polymer based on the total weight of binder polymer.

Tie-Coat Composition 3 (Comparative)

The solution of 70 wt % solution of first binder polymer in MAK prepared as described above was used as tie-coat composition 3.

Preparation of Topcoat Composition

Three topcoat compositions were prepared by high speed dispersion of the components mentioned in Table 1 below.

Adhesion Testing 1 (Dry Adhesion)

6×4" aluminium Q-panels were surface roughened using sandpaper and then degreased with solvent. Panels were then brush coated on both sides with tie-coat composition 1 or tie-coat composition 2 and dried at 23° C. and 50% relative humidity for 3 hours. A topcoat composition prepared as described above was applied by brush and dried for 24 hours at 23° C. and 50% relative humidity.

After 24 hours drying, adhesion of the topcoat to the tie-coat was qualitatively assessed by using a penknife blade to cut through and remove a small section of the coatings down to the substrate. The exposed section was rubbed by a finger and the adhesion between tie-coat and topcoat was given a rating between 0 (poor adhesion) and 5 (very good adhesion).

Adhesion Testing 2 (Wet Adhesion in Seawater)

Test panels prepared and dried as described above for adhesion testing 1 were immersed in natural seawater (conductivity of 42.6 mS/cm) at 22° C. After 1 day, 4 days and 14 days, adhesion between tie-coat and topcoat was qualitatively assessed with the method as described above. Resin A is the reaction product of an α,ω-dihydroxy polydimethylsiloxane and an excess of (N,N-dibutylamino methyl) triethoxysilane The preparation of such resins is described in Chinese patent application CN 101134887 A.

Adhesion Testing 3 (Wet Adhesion in Freshwater)

Test panels were prepared and exposed to ambient outdoor conditions for 24 hours as as described above for adhesion testing 1. The test panels were then immersed in distilled water (conductivity of 1 μS/cm) at 22° C. as a model for fresh water. After 1 day, 4 days and 14 days, adhesion between tie-coat and topcoat was qualitatively assessed with the method as described above.

The results of the adhesion tests are shown in Table 2 below. The results demonstrate that the tie-coat composition according to the invention has improved dry adhesion to a PDMS foul release topcoat whilst the wet adhesion in both seawater and fresh water is not adversely affected.

TABLE 1

Composition (in wt %) of top-coat compositions

| Component | Topcoat 1 | Topcoat 2 | Topcoat 3 | Function |
| --- | --- | --- | --- | --- |
| Hydroxy-terminated polydimethylsiloxane (Dow Corning 3-0213 Polymer) | 64.9 | 64.5 | | resin |
| (N,N-dibutylaminomethyl) diethoxysilyl terminated polydimethylsiloxane + (N,N-dibutylaminomethyl) triethoxysilane* | | | 57.1 | resin and curing agent |
| Tetraethoxysilane | 4.4 | 2.9 | | curing agent |
| Dioctyltin laurate | 0.5 | 0.6 | | catalyst |
| Xylene | 20.6 | 18.6 | | solvent |
| Naphtha (petroleum), light aromatic | | | 18.0 | solvent |
| Dearomatised white spirit D40 | | | 12.0 | solvent |
| Titanium dioxide | 2.7 | | 7.8 | colouring pigment |
| Black iron oxide | 0.6 | | | colouring pigment |
| Red iron oxide | | 2.6 | | colouring pigment |
| Hydrophobic fumed silica | 3.1 | 2.1 | 1.0 | thixotrope |
| 2,4-pentanedione | 3.2 | 4.1 | | cure inhibitor |
| Non-curable fluid** | | 3.9 | 3.1 | foul-release promoter |

*Reaction product of an α,ω-dihydroxy polydimethylsiloxane and an excess of (N,N-dibutylaminomethyl) triethoxysilane, prepared as described in Chinese patent application CN 101134887 A.

**poly(oxyalkylene)-modified polysiloxane

TABLE 2

| | | | Adhesion rating | | | | | | |
|---|---|---|---|---|---|---|---|---|---|
| | | | dry | seawater | | | freshwater | | |
| Experiment | Tie-coat | Topcoat | 24 h | 1 d | 4 d | 14 d | 1 d | 4 d | 14 d |
| A | composition 1 (comparative) | Topcoat 1 | 1 | 5 | 5 | 5 | 5 | 5 | 5 |
| B | composition 1 (comparative) | Topcoat 2 | 1 | 5 | 5 | 5 | 5 | 5 | 5 |
| C | composition 1 (comparative) | Topcoat 3 | 1 | 4 | 5 | 5 | 5 | 5 | 5 |
| D | composition 2 (inventive) | Topcoat 1 | 4 | 5 | 5 | 5 | 5 | 5 | 5 |
| E | composition 2 (inventive) | Topcoat 2 | 4 | 5 | 5 | 5 | 5 | 5 | 5 |
| F | composition 2 (inventive) | Topcoat 3 | 4 | 5 | 5 | 5 | 5 | 5 | 5 |
| G | composition 3 (comparative) | Topcoat 3 | 5 | 2 | 2 | 2 | 2 | 2 | 2 |

Adhesion between tie-coat and foul-release topcoat

The invention claimed is:

1. A substrate coated with a tie-coat layer and a topcoat layer, wherein; the tie-coat layer is deposited from a tie-coat composition comprising one or more binder polymers obtainable by copolymerizing a mixture of ethylenically unsaturated monomers, the one or more binder polymers comprising pendant curable alkoxysilyl functional groups of general formula (I)

$$-X-L-Si(R^1)_n(OR^2)_{(3-n)} \quad (I)$$

wherein:
L is a hydrocarbon linker group having 1 to 20 carbon atoms;
X is a heteroatom other than a sulphur atom;
n is 0, 1, or 2;
$R^1$ is an alkyl radical with 1 to 20 carbon atoms; and
$R^2$ is an alkyl radical with 1 to 20 carbon atoms or an alkylalkoxy radical with 2 to 20 carbon atoms,
wherein in at least 5 mole % of the curable alkoxysilyl functional groups comprised in the one or more binder polymers, the hydrocarbon linker group L is a methyldiyl group (L1) and in at least 5 mole % of the curable alkoxysilyl functional groups comprised in the one or more binder polymers, the hydrocarbon linker group L is a hydrocarbon group having 2 to 20 carbon atoms (L2), and
wherein the tie-coat composition does not comprise a cross-linking agent; and
wherein the topcoat layer is deposited from a topcoat composition comprising a resin with condensable silane groups.

2. A substrate according to claim 1, wherein in the tie-coat composition the molar ratio between curable alkoxysilyl functional groups with linker group L1 and curable alkoxysilyl functional groups with linker group L2 is in the range of from 15:85 to 75:25.

3. A substrate according to claim 1, wherein in the tie-coat composition linker group L2 is an alkyldiyl group having 2 to 6 carbon atoms.

4. A substrate according to claim 1, wherein in the tie-coat composition $R^1$ and $R^2$ are, independently an alkyl radical with 1 to 6 carbon atoms.

5. A substrate according to claim 1 wherein the tie-coat composition comprises a first and a second binder polymer as specified in claim 1, wherein the curable alkoxysilyl functional groups comprised in the first binder polymer have the linker group L1 and the curable alkoxysilyl functional groups comprised in the second binder polymer have the linker group L2.

6. A substrate according to claim 1, wherein in the tie-coat composition the ethylenically unsaturated monomers are esters of acrylic acid, methacrylic acid, or mixtures thereof.

7. A substrate according to claim 1, wherein in the tie-coat composition the one or more binder polymers are, independently, obtainable by copolymerising a mixture of ethylenically unsaturated monomers with alkoxysilyl functionality and ethylenically unsaturated monomers without alkoxysilyl functionality.

8. A substrate according to claim 7, wherein in the tie-coat composition the molar ratio of ethylenically unsaturated monomers with alkoxysilyl functionality to ethylenically unsaturated monomers without alkoxysilyl functionality is in the range of from 5:95 to 25:75.

9. A process for controlling aquatic fouling on a surface of a man-made object comprising:
applying on the surface of the man-made object a first layer of a tie-coat composition as defined in claim 1;
applying on the first layer of tie-coat composition a second layer of a topcoat composition comprising a resin with condensable silane groups; and
allowing the first and second coating layers to cure.

10. A process according to claim 9, wherein the resin with condensable silane groups is a curable polydiorganosiloxane resin.

11. A process according to claim 9, wherein the topcoat composition further comprises a non-volatile, non-curable fluid.

12. A process according to claim 11, wherein the non-volatile, non-curable fluid is a poly(oxyalkylene)-modified polysiloxane.

13. A process according to claim 9, wherein an aged or damaged coating is present on the surface of the man-made object to which the first layer of tie-coat composition is applied.

14. A substrate according to claim 1, wherein the tie-coat layer is deposited on an aged or damaged coating.

15. A substrate according to claim 1, wherein in the tie-coat composition the ethylenically unsaturated monomers are C1-C16 esters of acrylic acid, C1-C16 esters of methacrylic acid, or mixtures thereof.

16. A substrate according to claim 1, wherein the tie-coat composition X is an oxygen atom or nitrogen atom.

17. A substrate according to claim 1, wherein the tie-coat layer is deposited on a bare substrate or a surface coated with one or more primer or anticorrosive coatings.

18. A process according to claim 9, wherein the surface of the surface of the man-made object is a bare surface or a surface coated with one or more primer or anticorrosive coatings.

19. A substrate according to claim 1, wherein the one or more binder polymers of the tie-coat composition have a number average molecular weight in the range of from 1 000 to 50 000 Daltons.

20. A substrate according to claim 1, wherein the tie-coat composition comprises in the range of from 65 to 95 wt % binder polymer.

21. A substrate according to claim 1, wherein the tie-coat composition and the topcoat composition are liquid compositions.

22. A substrate according to claim 9, wherein the tie-coat composition and the topcoat composition are liquid compositions.

23. A substrate according to claim 1, wherein the topcoat composition is a foul release coating composition.

* * * * *